(12) United States Patent
Ando et al.

(10) Patent No.: US 12,420,382 B2
(45) Date of Patent: Sep. 23, 2025

(54) MAGNETIC CHUCK

(71) Applicant: SMC CORPORATION, Tokyo (JP)

(72) Inventors: Mizuki Ando, Tsukubamirai (JP);
Sebastian Bialas, Egelsbach (DE);
Stephan Schweissing, Egelsbach (DE)

(73) Assignee: SMC CORPORATION, Tokyo (JP)

( * ) Notice: Subject to any disclaimer, the term of this patent is extended or adjusted under 35 U.S.C. 154(b) by 342 days.

(21) Appl. No.: 18/322,995

(22) Filed: May 24, 2023

(65) Prior Publication Data

US 2023/0381928 A1  Nov. 30, 2023

(30) Foreign Application Priority Data

May 30, 2022 (JP) ................................. 2022-087630
May 15, 2023 (JP) ................................. 2023-080095

(51) Int. Cl.
*B23Q 3/00* (2006.01)
*B25B 11/00* (2006.01)

(52) U.S. Cl.
CPC ................. *B25B 11/002* (2013.01)

(58) Field of Classification Search
CPC ......... B25B 11/00; B25B 11/002; B23Q 3/00; B23Q 3/06; B23Q 3/154; B23Q 3/1543; B23Q 3/1546

See application file for complete search history.

(56) References Cited

U.S. PATENT DOCUMENTS

| | | | | |
|---|---|---|---|---|
| 5,855,365 A | * | 1/1999 | Hong | B25B 5/061 269/33 |
| 2016/0184981 A1 | * | 6/2016 | Kanda | B23Q 3/1546 269/8 |
| 2016/0189844 A1 | * | 6/2016 | Yajima | H01F 7/0257 335/285 |
| 2021/0023665 A1 | * | 1/2021 | Yajima | B23Q 3/1546 |
| 2021/0101236 A1 | * | 4/2021 | Yajima | B25J 15/0608 |
| 2022/0063036 A1 | * | 3/2022 | Sato | B25J 15/0608 |
| 2023/0381928 A1 | * | 11/2023 | Ando | B25B 11/002 |

FOREIGN PATENT DOCUMENTS

JP      2019-186324 A      10/2019

* cited by examiner

*Primary Examiner* — Lee D Wilson
(74) *Attorney, Agent, or Firm* — Oblon, McClelland, Maier & Neustadt, L.L.P.

(57) ABSTRACT

A magnetic chuck includes a first cylinder and a second cylinder that are arranged in series with each other. A first piston of the first cylinder includes a permanent magnet, and a piston rod connected to the first piston is inserted into a second piston of the second cylinder. A stopper that can abut against the second piston is fixed to the piston rod. The position of the stopper can be changed relative to the piston rod.

8 Claims, 12 Drawing Sheets

MAGNETIC CHUCK

CROSS-REFERENCE TO RELATED APPLICATIONS

This application is based upon and claims the benefit of priority from Japanese Patent Applications No. 2022-087630 filed on May 30, 2022 and No. 2023-080095 filed on May 15, 2023, the contents of which are incorporated herein by reference.

BACKGROUND OF THE INVENTION

Field of the Invention

The present invention relates to a magnetic chuck that attracts and retains a workpiece by the magnetic force of a permanent magnet.

Description of the Related Art

Conventionally, there has been known a magnetic chuck in which a permanent magnet is coupled to a piston inside a cylinder and the permanent magnet is displaced together with the piston. With such a magnetic chuck, following the displacement of a piston that has received fluid pressure, a permanent magnet is brought into close proximity to a workpiece, along with the workpiece being attracted and retained thereby. Further, when the piston is displaced in a direction to separate away from the workpiece, the workpiece is released.

When a stacked thin workpiece is to be retained by such a magnetic chuck, there is a problem in that the magnetic force is also transmitted to the lower workpiece and a plurality of workpieces are retained at a time. In order to retain only a single workpiece, it is necessary to adjust the magnetic force to be suitable for the thickness of the workpiece.

Therefore, J P 2019-186324 A proposes a magnetic chuck capable of adjusting a moving end position of a piston assembly including a permanent magnet. According to this magnetic chuck, the position of the permanent magnet is adjusted by an adjuster such that the magnetic force of the permanent magnet retains exactly a single workpiece. Therefore, only a single workpiece among the plurality of stacked workpieces is retained.

SUMMARY OF THE INVENTION

However, since the magnetic force of the permanent magnet exerted on the workpiece is adjusted to a magnetic force suitable for retaining just a single workpiece, when the workpiece is conveyed to another place, the workpiece may fall due to acceleration of conveyance or generation of vibration.

An object of the present invention is to solve the aforementioned problems.

According to the present invention, there is provided a magnetic chuck that attracts and retains a workpiece by a magnetic force of a permanent magnet, the magnetic chuck including a first cylinder and a second cylinder that are arranged in series with each other. A first piston of the first cylinder includes the permanent magnet, a piston rod connected to the first piston is inserted into a second piston of the second cylinder, a stopper configured to abut against the second piston is fixed to the piston rod, and a position of the stopper relative to the piston rod is configured to be changed.

According to the magnetic chuck of the present invention, the first piston can be controlled to be in the three positions, i.e., a position where no magnetic force acts on the workpiece, a position where the workpiece is retained with the maximum magnetic force, and a position where the workpiece is attracted with a predetermined magnetic force smaller than the maximum magnetic force. Therefore, the only one workpiece among the plurality of stacked workpieces can be attracted with the predetermined magnetic force, and the workpiece can be retained and transported with the maximum magnetic force. The workpiece is safely transported without falling even if acceleration at the time of transportation is large.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

A description will be given with reference to FIGS. 1 to 4 concerning a magnetic chuck 10 according to the first embodiment of the present invention.

Figure 1:
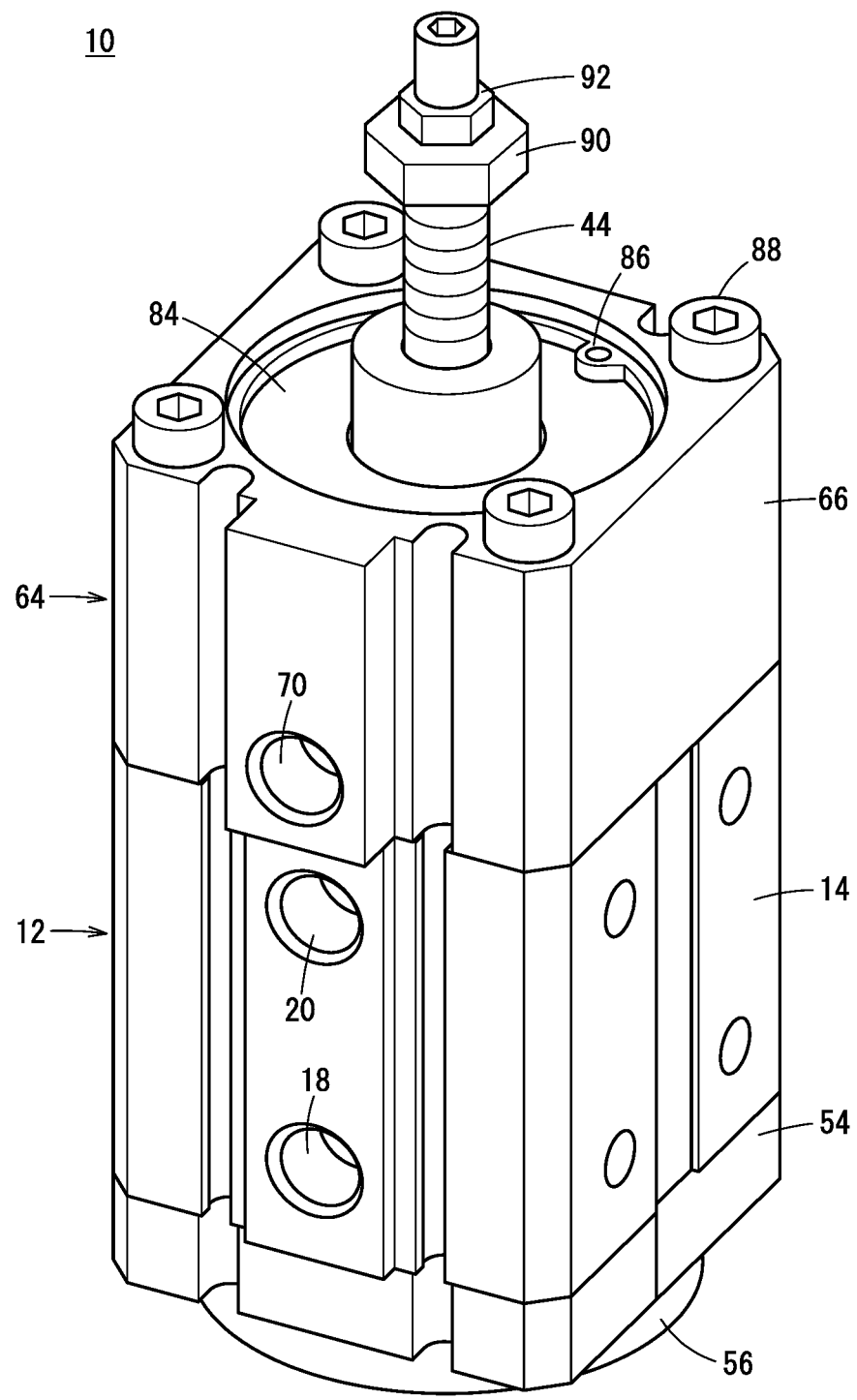
FIG. 1 is an external view of a magnetic chuck according to a first embodiment of the present invention.
Figure 2:
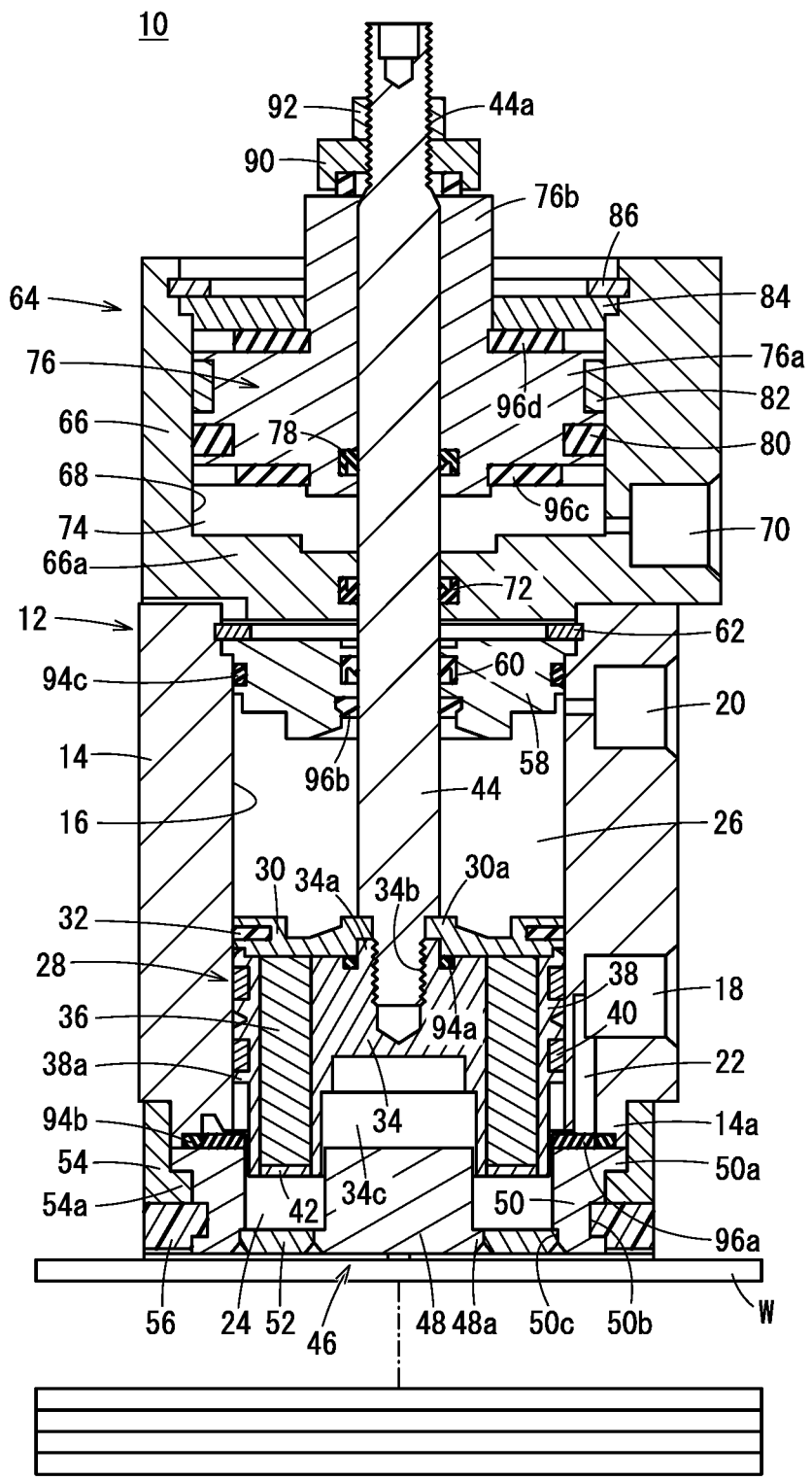
FIG. 2 is a cross-sectional view of the magnetic chuck of FIG. 1 when attracting a workpiece.

As shown in FIGS. 1 and 2, the magnetic chuck 10 has a structure in which a first cylinder 12 and a second cylinder 64 are arranged in series. The first cylinder 12 includes a first cylinder tube 14, a first piston 28, a bottom cover 46 and an intermediate cover 58. The second cylinder 64 includes a second cylinder tube 66, a second piston 76, and a top cover 84. The magnetic chuck 10, for example, is attached to a non-illustrated robot arm.

First, the configuration of the first cylinder 12 will be mainly described. The cylindrical first cylinder tube 14 is made of a paramagnetic material such as an aluminum alloy. The outer shape of the horizontal cross-section of the first cylinder tube 14 is rectangular. The first cylinder tube 14 has a circular first cylinder hole 16. A side surface of the first cylinder tube 14 includes at a lower portion thereof a first port 18 for supplying and exhausting air and a second port 20 at an upper portion thereof for supplying and exhausting air. Air is supplied from an air supply source (not shown) to the first port 18 and the second port 20. The first port 18 is connected to an upper end of an air passage 22 extending vertically in a side wall of the first cylinder tube 14. The first cylinder tube 14 includes a circular fitting portion 14a protruding downward.

The first piston 28 includes a seal holder 30, a core yoke 34, a permanent magnet 36, a cover yoke 38, and a ring plate 42. The disk-shaped seal holder 30 is made of a paramagnetic material such as an aluminum alloy. A piston seal 32 is mounted on the outer periphery of the seal holder 30 and is in sliding contact with the wall surface of the first cylinder hole 16. The piston seal 32 of the seal holder 30 maintains airtightness between a first air chamber 24 and a second air chamber 26 which are described later. The seal holder 30 has a through hole at the center thereof, and includes a flange 30a protruding radially inward from an upper portion of the through hole.

The cylindrical core yoke 34 is made of iron and/or steel materials which are ferromagnetic materials. The core yoke 34 includes a protruding end portion 34a that protrudes upward, and a bottomed screw hole 34b that opens at a distal end of the protruding end portion 34a. A lower portion of the core yoke 34 has a circular recess 34c that opens downward. The protruding end portion 34a of the core yoke 34 is inserted into the through hole of the seal holder 30 from below and abuts against the flange 30a of the seal holder 30.

A piston rod 44 is made of a paramagnetic material such as an aluminum alloy. The piston rod 44 is inserted into the through hole of the seal holder 30 from above and is screw-engaged with the screw hole 34b of the core yoke 34. Thus, the seal holder 30 and the core yoke 34 are connected to a lower end of the piston rod 44. A first seal member 94a is mounted to a root of the protruding end portion 34a of the core yoke 34. The first seal member 94a maintains airtightness between the seal holder 30 and the core yoke 34.

The cylindrical permanent magnet 36 is disposed on an outer periphery of the core yoke 34 and is attached so as to be surrounded by the seal holder 30, the core yoke 34, the cover yoke 38, and the ring plate 42. The permanent magnet 36 is magnetized in a radial direction.

The cylindrical cover yoke 38 is made of iron and/or steel materials which are ferromagnetic material, and is disposed on an outer periphery of the permanent magnet 36. An outer periphery of the cover yoke 38 has a stepped portion 38a, and an outer diameter of an upper portion of the cover yoke 38 is larger than an outer diameter of a lower portion of the cover yoke 38. A pair of wear rings 40 are mounted on the outer periphery of the cover yoke 38. The first piston 28 is guided and supported by the first cylinder hole 16 via the pair of wear rings 40.

The bottom cover 46 includes a bottom yoke 48, an outer yoke 50, a first housing 54 and a second housing 56. The columnar bottom yoke 48 is made of iron and/or steel materials which are ferromagnetic materials. The bottom yoke 48 enters the recess 34c of the core yoke 34 when the first piston 28 descends. A lower portion of the bottom yoke 48 includes a flange 48a that protrudes radially outward.

The cylindrical outer yoke 50 is made of iron and/or steel materials which are ferromagnetic materials, and is disposed outside the bottom yoke 48. An upper portion of the outer yoke 50 includes a flange 50a protruding radially outward. A lower portion of the outer yoke 50 has a recess 50b on its outer periphery and a stepped portion 50c on its inner periphery. An annular connecting plate 52 is disposed between the flange 48a of the bottom yoke 48 and the stepped portion 50c of the outer yoke 50. The connecting plate 52 is made of a paramagnetic material such as an aluminum alloy. The outer yoke 50 is fixed to the bottom yoke 48 via the connecting plate 52. The outer yoke 50 and the connecting plate 52 are airtightly joined to each other, and the connecting plate 52 and the bottom yoke 48 are joined to each other in an airtight manner.

The cylindrical first housing 54 is made of a paramagnetic material such as an aluminum alloy. The outer shape of the horizontal cross-section of the first housing 54 is a rectangular shape similar to the first cylinder tube 14. The fitting portion 14a of the first cylinder tube 14 is fitted inside the first housing 54. A lower end portion of the first housing 54 includes a flange 54a that protrudes radially inward.

The cylindrical second housing 56 is made of a resin material or a rubber material. The second housing 56 is fitted and fixed to the recess 50b of the outer yoke 50. A second seal member 94b is mounted in a gap formed between the lower end of the fitting portion 14a of the first cylinder tube 14 and an upper surface of the outer yoke 50. The second seal member 94b maintains airtightness between the first cylinder tube 14 and the outer yoke 50.

An annular first damper 96a is disposed on the upper surface of the outer yoke 50. When the first piston 28 descends, the first damper 96a comes into contact with the stepped portion 38a of the cover yoke 38 to alleviate shocks. The upper surface of the first damper 96a has a plurality of slits (not shown) extending in the radial direction. The lower end of the air passage 22 of the first cylinder tube 14 communicates with the first cylinder hole 16 via the slits of the first damper 96a.

The disk-shaped intermediate cover 58 is disposed above the first cylinder hole 16 and is fixed to the first cylinder tube 14 via a latching ring 62. The intermediate cover 58 is made of, for example, iron and/or steel materials which are ferromagnetic materials, but is not limited thereto. The piston rod 44 is inserted through the intermediate cover 58 and extends upward from the intermediate cover 58. The piston rod 44 is in sliding contact with a first rod packing 60 mounted on the intermediate cover 58.

A second damper 96b is attached to the lower end of the intermediate cover 58. When the first piston 28 ascends, the second damper 96b comes into contact with the seal holder 30 of the first piston 28 to alleviate shocks. A third seal member 94c that abuts against the wall surface of the first cylinder hole 16 is mounted on an outer periphery of the intermediate cover 58. The third seal member 94c maintains airtightness between the first cylinder tube 14 and the intermediate cover 58.

The first air chamber 24 is disposed under the first piston 28, and the second air chamber 26 is disposed above the first piston 28. The first air chamber 24 is a space surrounded by the first piston 28, the first cylinder tube 14, and the bottom cover 46. The second air chamber 26 is a space surrounded by the first piston 28, the first cylinder tube 14, and the intermediate cover 58.

The first port 18 communicates with the first air chamber 24 via the air passage 22 of the first cylinder tube 14 and the slits of the first damper 96a. The second port 20 communicates with the second air chamber 26. When air is supplied to the first air chamber 24, the first piston 28 is biased upward. When air is supplied to the second air chamber 26, the first piston 28 is biased downward. The configuration of the first cylinder 12 is substantially as described above.

Next, the configuration of the second cylinder 64 will be mainly described. The cylindrical second cylinder tube 66 is made of a paramagnetic material such as an aluminum alloy. The outer shape of the horizontal cross-section of the second cylinder tube 66 is a rectangular shape similar to the first cylinder tube 14. The second cylinder tube 66 has a bottomed second cylinder hole 68. An inner diameter of the second cylinder hole 68 is larger than the inner diameter of the first cylinder hole 16.

A side surface of the second cylinder tube 66 is provided with a third port 70 for supplying and exhausting air. Air having the same pressure as the air supplied to the second port 20 is supplied to the third port 70 from an air supply source (not shown). The piston rod 44 is inserted through a bottom portion 66a of the second cylinder tube 66, and is in sliding contact with a second rod packing 72 mounted on the bottom portion 66a of the second cylinder tube 66.

The second piston 76 is made of a paramagnetic material such as an aluminum alloy. The second piston 76 includes a piston portion 76a fitted in the second cylinder hole 68 and a shaft portion 76b projecting upward from the piston portion 76a. The piston rod 44 is inserted through the second piston 76 and is in sliding contact with a third rod packing 78 mounted on the second piston 76. The second piston 76 is movable up and down relative to the piston rod 44.

A piston seal 80 is mounted on the outer periphery of the piston portion 76a of the second piston 76 and is in sliding contact with the wall surface of the second cylinder hole 68. The piston seal 80 of the second piston 76 maintains airtightness of a later-described third air chamber 74 from the outside. A wear ring 82 is mounted on the outer periphery of the piston portion 76a of the second piston 76. The second piston 76 is guided and supported by the second cylinder hole 68 via the wear ring 82.

A third damper 96c is attached to a lower end of the piston portion 76a of the second piston 76. When the second piston 76 descends, the third damper 96c comes into contact with the bottom portion 66a of the second cylinder tube 66 to alleviate shocks. A fourth damper 96d is attached to an upper end of the piston portion 76a of the second piston 76. When the second piston 76 ascends, the fourth damper 96d comes into contact with the top cover 84 to alleviate shocks.

The disc-shaped top cover 84 is fixed to an upper portion of the second cylinder tube 66 via a latching ring 86. The shaft portion 76b of the second piston 76 is inserted through the top cover 84. The piston rod 44 extending upward from the intermediate cover 58 passes through the bottom portion 66a of the second cylinder tube 66 and the second piston 76, and extends upward from the second piston 76.

The third air chamber 74 is disposed under the second piston 76. The third air chamber 74 is a space surrounded by the second piston 76 and the second cylinder tube 66. The third port 70 communicates with the third air chamber 74. When air is supplied to the third air chamber 74, the second piston 76 is biased upward. The configuration of the second cylinder 64 is substantially as described above.

A plurality of tie rods 88 are inserted through the second cylinder tube 66, and an end portion of each of the tie rods 88 is screw-engaged with the first cylinder tube 14. The first housing 54 is fixed to the first cylinder tube 14 by screw parts (not shown). As a result, the three constituent elements of the second cylinder tube 66, the first cylinder tube 14, and the first housing 54 are integrally connected. At this time, since the flange 50a of the outer yoke 50 is sandwiched and held between the fitting portion 14a of the first cylinder tube 14 and the flange 54a of the first housing 54, the outer yoke 50 is also connected and fixed.

An end of the piston rod 44 extending upwardly from the second piston 76 has an externally threaded portion 44a. A stopper 90 and a lock nut 92 are screw-engaged with the externally threaded portion 44a of the piston rod 44. The stopper 90 can abut against an upper end of the shaft portion 76b of the second piston 76. When the lock nut 92 is loosened, the position of the stopper 90 relative to the piston rod 44 can be changed. When the lock nut 92 is tightened again after the position of the stopper 90 is changed, the stopper 90 is fixed at a desired position.

A piston area (pressure-receiving area) S1 of the first piston 28 by the air in the second air chamber 26 is equal to a difference between a cross-sectional area of the first cylinder hole 16 and a cross-sectional area of the piston rod 44. A piston area (pressure-receiving area) S2 of the second piston 76 by the air in the third air chamber 74 is equal to a difference between a cross-sectional area of the second cylinder hole 68 and the cross-sectional area of the piston rod 44. Since the cross-sectional area of the second cylinder hole 68 is larger than the cross-sectional area of the first cylinder hole 16, the piston area S2 of the second piston 76 is larger than the piston area S1 of the first piston 28.

Next, basic functions of the magnetic chuck 10 will be described. The first piston 28 of the magnetic chuck 10 is controlled to be in three positions of an "upper end position", a "lower end position" and an "adjustment position" by supplying and exhausting air to and from the first air chamber 24, the second air chamber 26, and the third air chamber 74.

Figure 4:
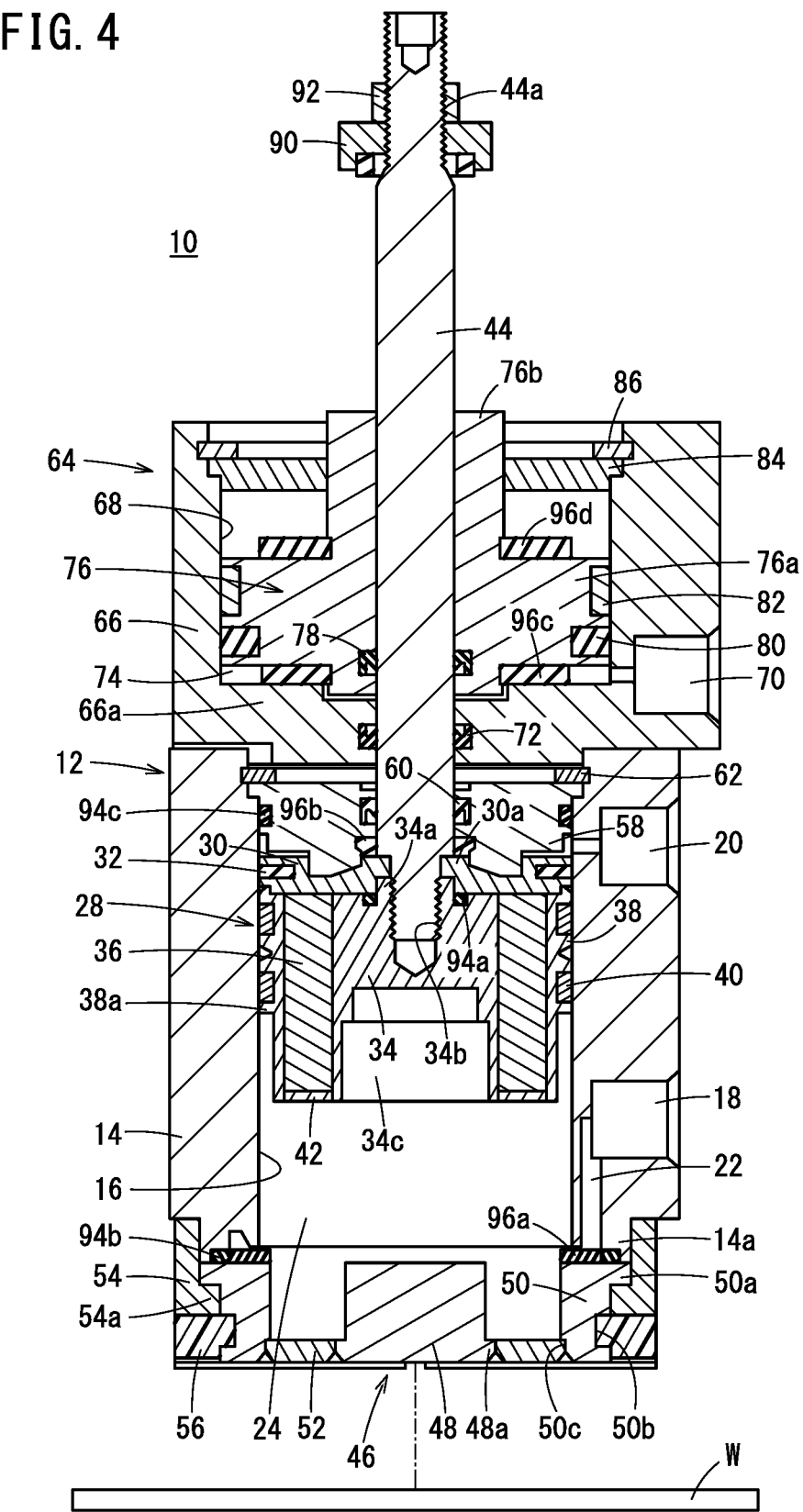
FIG. 4 is a cross-sectional view of the magnetic chuck of FIG. 1 when releasing the workpiece.

As shown in FIG. 4, the "upper end position" refers to a position at which the first piston 28 is displaced to the uppermost position in the first cylinder hole 16 and the seal holder 30 abuts against the second damper 96b. The "upper end position" is achieved by supplying air to the first air chamber 24 and exhausting air from the second air chamber 26 and the third air chamber 74. When the first piston 28 is controlled to be in the "upper end position", even if a workpiece W such as a ferromagnetic iron plate (hereinafter simply referred to as a "workpiece") is present at a lower end of the bottom cover 46, the magnetic force of the permanent magnet 36 does not act on the workpiece W.

Figure 3:
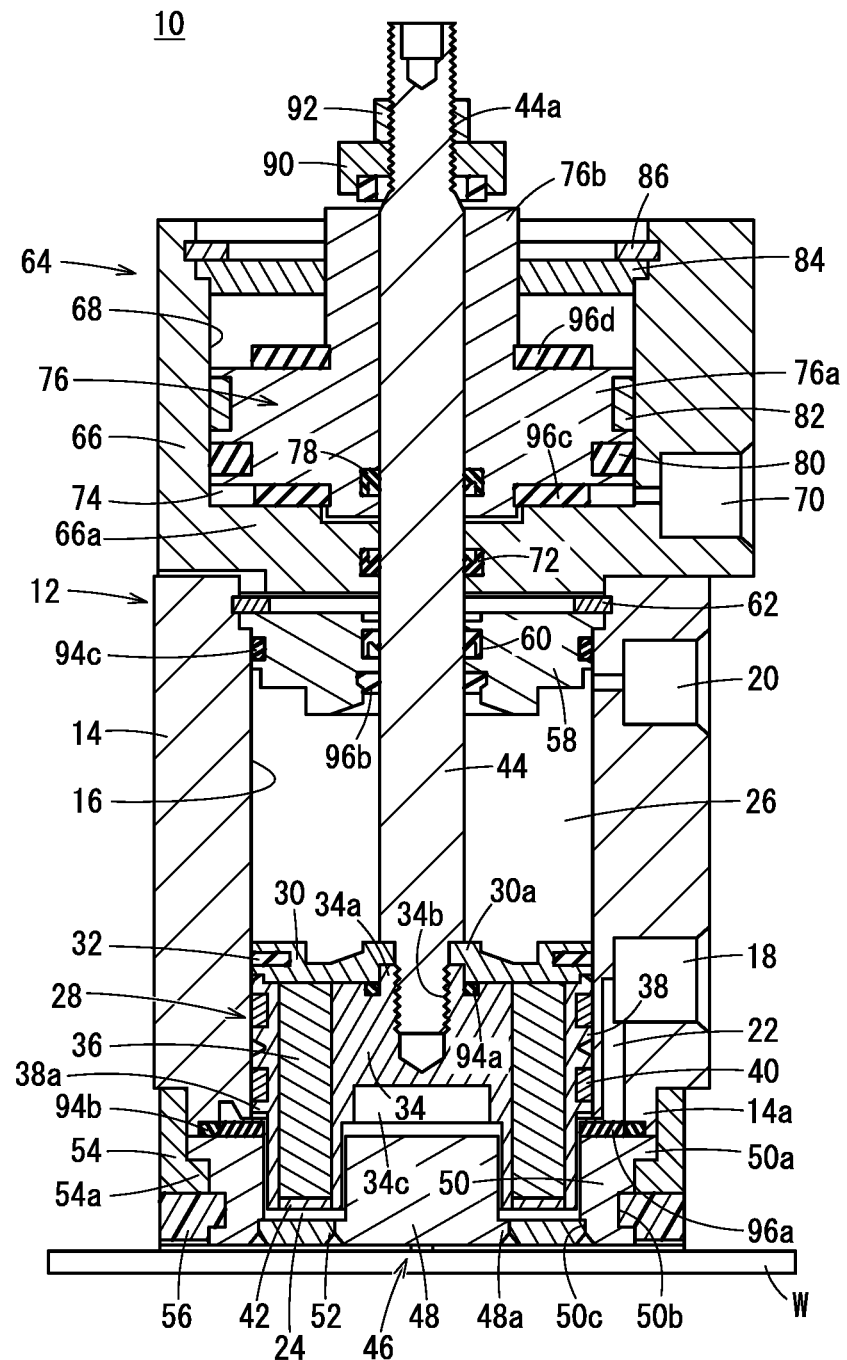
FIG. 3 is a cross-sectional view of the magnetic chuck of FIG. 1 when transporting the workpiece.

As shown in FIG. 3, the "lower end position" refers to a position (a stroke end) when the first piston 28 is displaced to the lowermost position in the first cylinder hole 16 and the cover yoke 38 abuts against the first damper 96a. The "lower end position" is achieved by supplying air to the second air chamber 26 and exhausting air from the first air chamber 24 and the third air chamber 74. When the first piston 28 is controlled to be in the "lower end position", if the workpiece W is present at the lower end of the bottom cover 46, the workpiece W is attracted by the maximum magnetic force.

As shown in FIG. 2, the "adjustment position" refers to a position where the first piston 28 is separated upward from the "lower end position" by a predetermined distance, in relation to the displacement of the second piston 76 to the uppermost position in the second cylinder hole 68. The "adjustment position" is achieved by supplying air to the second air chamber 26 and the third air chamber 74 and exhausting air from the first air chamber 24. When the first piston 28 is controlled to be in the "adjustment position", if the workpiece W is present at the lower end of the bottom cover 46, the workpiece W is attracted by a predetermined magnetic force (hereinafter referred to as "adjusted magnetic force") smaller than the maximum magnetic force.

When the first piston 28 is controlled to be in the "lower end position" and the "adjustment position", most of the magnetic flux lines emitted from the permanent magnet 36 return to the permanent magnet 36 via the core yoke 34, the bottom yoke 48, the workpiece W, the outer yoke 50, and the cover yoke 38.

When a plurality of workpieces are stacked on the lower end of the bottom cover 46, the magnitude of the adjusted magnetic force is adjusted in order that only the uppermost workpiece W is attracted. The magnitude of the adjusted magnetic force varies depending on the material, weight, and the like of the workpiece W. The magnitude of the adjusted magnetic force can be adjusted by changing the position of the stopper 90 relative to the piston rod 44. The basic functions of the magnetic chuck 10 are as described above.

Next, operations will be described, in attracting and transporting only the uppermost workpiece W among a plurality of workpieces stacked on a floor surface, using the magnetic chuck 10 attached to the robot arm. A state in which the first piston 28 is controlled to be in the "upper end position" is referred to as an initial state.

From the initial state, the robot arm is driven, and the magnetic chuck 10 approaches, from above, a plurality of workpieces stacked on the floor surface. At the same time, the air in the first air chamber 24 is exhausted and air is supplied to the second air chamber 26 and the third air chamber 74.

When air is supplied to the second air chamber 26, the first piston 28 and the piston rod 44 are biased downward. When air is supplied to the third air chamber 74, the second piston 76 is biased upward. The stopper 90 integral with the downwardly biased piston rod 44 abuts against the upwardly biased second piston 76.

In this case, the piston area S2 of the second piston 76 is larger than the piston area S1 of the first piston 28, and the air pressure acting on the second piston 76 is the same as the air pressure acting on the first piston 28. Therefore, the force with which the upwardly biased second piston 76 pushes up the piston rod 44 via the stopper 90 exceeds the force with which the piston rod 44 is biased downward. The second piston 76 is displaced to the uppermost position in the second cylinder hole 68, and is held at a position where the fourth damper 96d abuts against the top cover 84. Further, the piston rod 44 is held in a state in which the stopper 90 integrated with the piston rod 44 abuts against the second piston 76. In other words, the first piston 28 is controlled to be in the "adjustment position".

After the first piston 28 is controlled to be in the "adjustment position", the magnetic chuck 10 further approaches the plurality of workpieces stacked on the floor surface. When the bottom cover 46 comes into contact with the uppermost workpiece W, only the workpiece W is attracted (see FIG. 2). Thereafter, when the magnetic chuck 10 moves upward and is sufficiently separated from the workpieces remaining on the floor surface, the air in the third air chamber 74 is exhausted.

Since air is continuously supplied to the second air chamber 26, the first piston 28 and the piston rod 44 are biased downward. On the other hand, when the air in the third air chamber 74 is exhausted, the force biasing the second piston 76 upward disappears. Therefore, the first piston 28 is displaced to the lowest position in the first cylinder hole 16, and the cover yoke 38 of the first piston 28 comes into contact with the first damper 96a. In other words, the first piston 28 is controlled to be in the "lower end position". At this time, the second piston 76 is pushed by the stopper 90 and displaced downward, and the third damper 96c comes into contact with the bottom portion 66a of the second cylinder tube 66.

When the first piston 28 is controlled to be in the "lower end position", the workpiece W is retained by the maximum magnetic force (see FIG. 3). Thereafter, the magnetic chuck 10 retaining only one workpiece W is moved to a predetermined location. Since the workpiece W is retained by the maximum magnetic force, the workpiece W does not drop even if the acceleration at the time of transporting is large, and is safely transported to a predetermined place.

Thereafter, the air in the second air chamber 26 is exhausted, and air is supplied to the first air chamber 24. When air is supplied to the first air chamber 24, the first piston 28 is biased upward. On the other hand, when the air in the second air chamber 26 is exhausted, the force biasing the first piston 28 downward disappears.

In this case, the force with which the first piston 28 is biased upward is set so as to exceed the magnetic force of attraction between the first piston 28 and the workpiece W. That is, the product of the pressure of the air supplied to the first air chamber 24 and the piston area (the cross-sectional area of the first cylinder hole 16) of the first piston 28 that receives the pressure of the air in the first air chamber 24 is set so as to be equal to or greater than a predetermined value. The first piston 28 is displaced to the uppermost position in the first cylinder hole 16, and the seal holder 30 of the first piston 28 abuts against the second damper 96b. That is, the first piston 28 is controlled to be in the "upper end position", and the workpiece W is released at the predetermined position (see FIG. 4).

In the above description, it is assumed that the first piston 28 is controlled from the "upper end position" to the "adjustment position" and only the uppermost workpiece W is attracted among the plurality of workpieces stacked on the floor surface. However, it is also possible to control the first piston 28 to the "lower end position" to attract a plurality of workpieces, and then control the first piston 28 to the "adjustment position" to attract only one workpiece W among them. For example, this is useful in a case where a plurality of workpieces are simultaneously transported to another place, and thereafter only one workpiece W is retained.

In this case, the force with which the second piston 76 pushes up the piston rod 44 via the stopper 90 by the air supplied to the third air chamber 74 may be set so as to exceed a combined force of the force with which the piston rod 44 is biased downward by the air supplied to the second air chamber 26 and the magnetic force of attraction between the first piston 28 and the workpiece W.

According to the magnetic chuck 10 of the present embodiment, the first piston 28 can be controlled to be in three positions: the "upper end position" where no magnetic force acts on the workpiece W, the "lower end position" where the workpiece W is retained with the maximum magnetic force, and the "adjustment position" where the workpiece W is attracted with a predetermined magnetic force smaller than the maximum magnetic force. Therefore, only one workpiece W among the plurality of stacked workpieces can be attracted, and the workpiece W can be retained with the maximum magnetic force and can be safely transported.

Further, by changing the position of the stopper 90 relative to the piston rod 44, the magnetic force acting on the workpiece W at the "adjustment position" can be set to optimum magnitude. Since the pressure of the air supplied to the third port 70 is the same as the pressure of the air supplied to the second port 20, the air supply system can be simplified.

Second Embodiment

Figure 5:
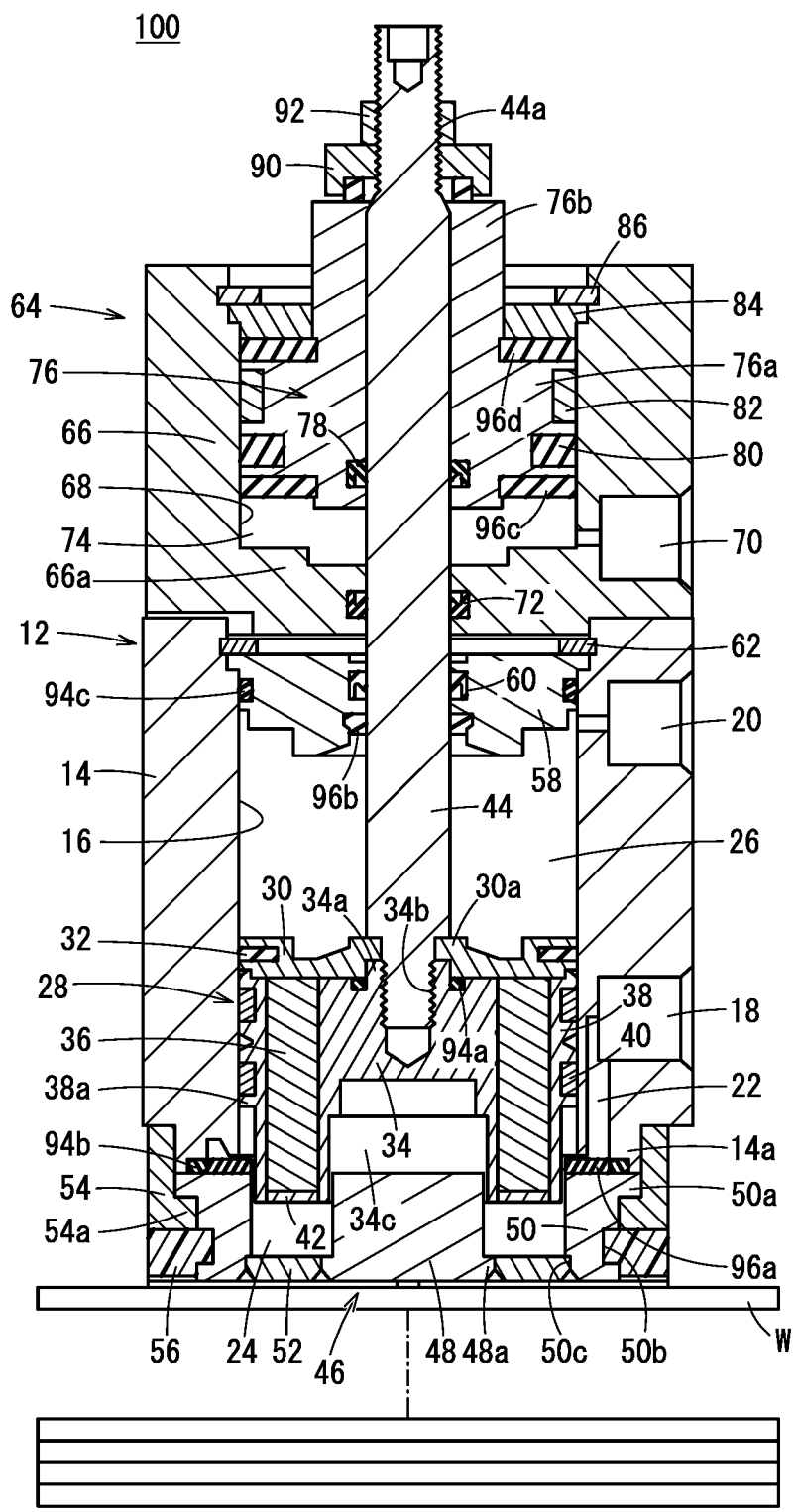
FIG. 5 is a cross-sectional view of a magnetic chuck according to a second embodiment of the present invention (a cross-sectional view when attracting a workpiece)

Next, a magnetic chuck 100 according to a second embodiment of the present invention will be described with reference to FIG. 5.

The magnetic chuck 100 according to the second embodiment is different from the magnetic chuck 10 in the relationship between the inner diameter of the first cylinder hole 16 and the inner diameter of the second cylinder hole 68, and the relationship between the pressure of the air supplied to the second port 20 and the pressure of the air supplied to the third port 70. Specifically, the inner diameter of the second cylinder hole 68 is the same as the inner diameter of the first cylinder hole 16, and the pressure of the air supplied to the third port 70 is higher than the pressure of the air supplied to the second port 20.

The "upper end position" is achieved by supplying air to the first air chamber 24 and exhausting air from the second air chamber 26 and the third air chamber 74. The "lower end position" is achieved by supplying air to the second air chamber 26 and exhausting air from the first air chamber 24 and the third air chamber 74. The "adjustment position" is achieved by supplying air to the second air chamber 26 and the third air chamber 74 and exhausting air from the first air chamber 24 (see FIG. 5).

When the first piston 28 is controlled to be in the "adjustment position", air is supplied to the second air chamber 26, whereby the first piston 28 and the piston rod 44 are biased downward. When air is supplied to the third air chamber 74, the second piston 76 is biased upward. The stopper 90 integral with the downwardly biased piston rod 44 abuts against the upwardly biased second piston 76.

The piston area S2 of the second piston 76 receiving the pressure by the air in the third air chamber 74 is equal to the piston area S1 of the first piston 28 receiving the pressure by the air in the second air chamber 26. However, the air pressure in the third air chamber 74 is higher than the air pressure in the second air chamber 26. The force with which the upwardly biased second piston 76 pushes up the piston rod 44 via the stopper 90 exceeds the force with which the piston rod 44 is biased downward. Therefore, the second piston 76 is displaced to the uppermost position in the second cylinder hole 68, and is held at a position where the fourth damper 96d abuts against the top cover 84. Thereafter, when the magnetic chuck 100 approaches and comes into contact with the plurality of workpieces stacked on the floor surface, only the uppermost workpiece W is attracted.

According to the magnetic chuck 100 of the present embodiment, the first piston 28 can be controlled to be in three positions: the "upper end position" where no magnetic force acts on the workpiece W, the "lower end position" where the workpiece W is retained with the maximum magnetic force, and the "adjustment position" where the workpiece W is attracted with a predetermined magnetic force smaller than the maximum magnetic force. Therefore, only one workpiece W among the plurality of stacked workpieces can be attracted, and the workpiece W can be retained with the maximum magnetic force and can be safely transported.

Further, by changing the position of the stopper 90 relative to the piston rod 44, the magnetic force acting on the workpiece W at the "adjustment position" can be set to optimum magnitude. Further, since the inner diameter of the second cylinder hole 68 is the same as the inner diameter of the first cylinder hole 16, the wall thickness of the second cylinder tube 66 can be made the same as the wall thickness of the first cylinder tube 14, and reduction in size is easy.

Third Embodiment

Figure 7:
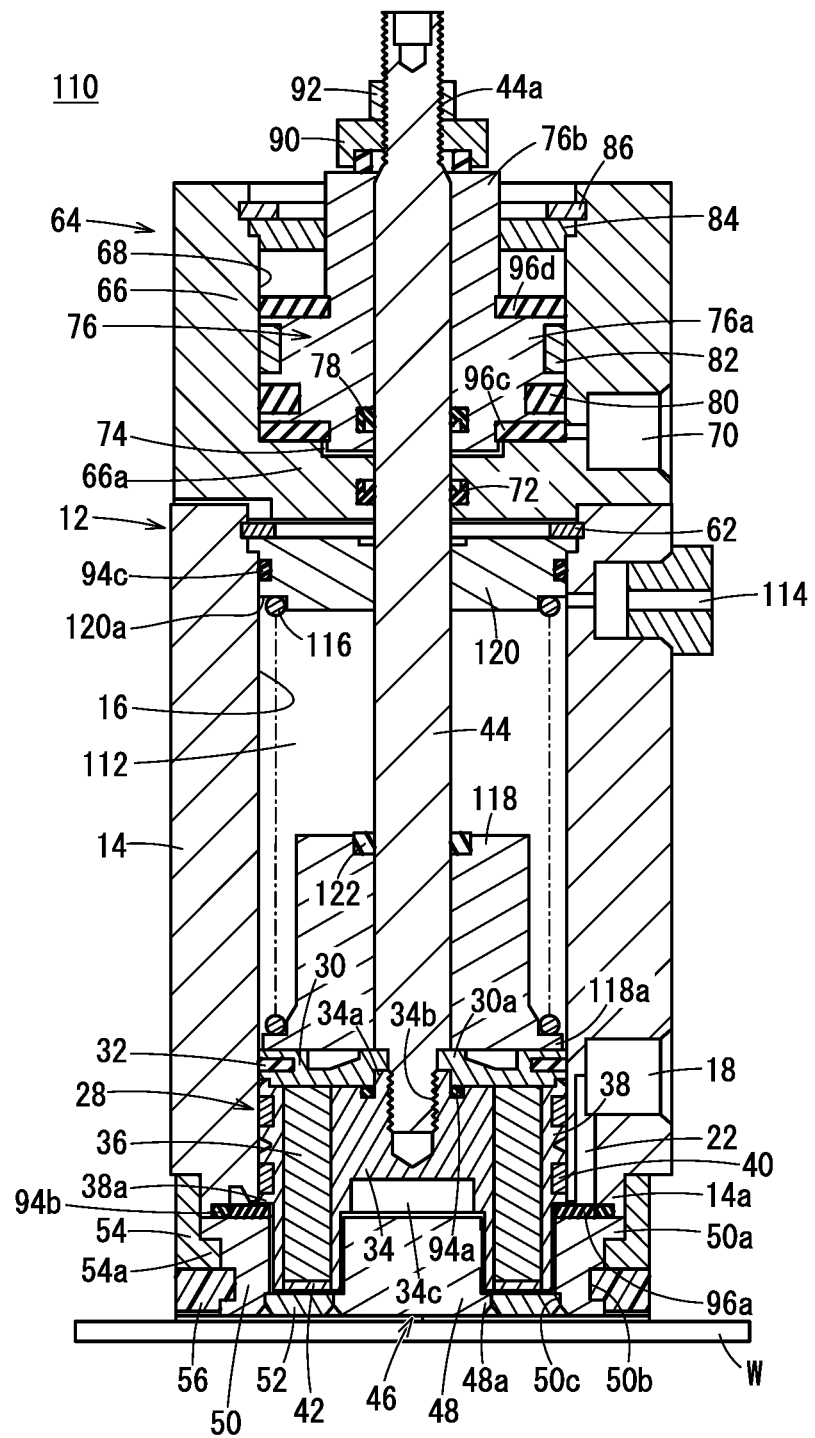
FIG. 7 is a cross-sectional view of the magnetic chuck of FIG. 6 when transporting the workpiece.
Figure 8:
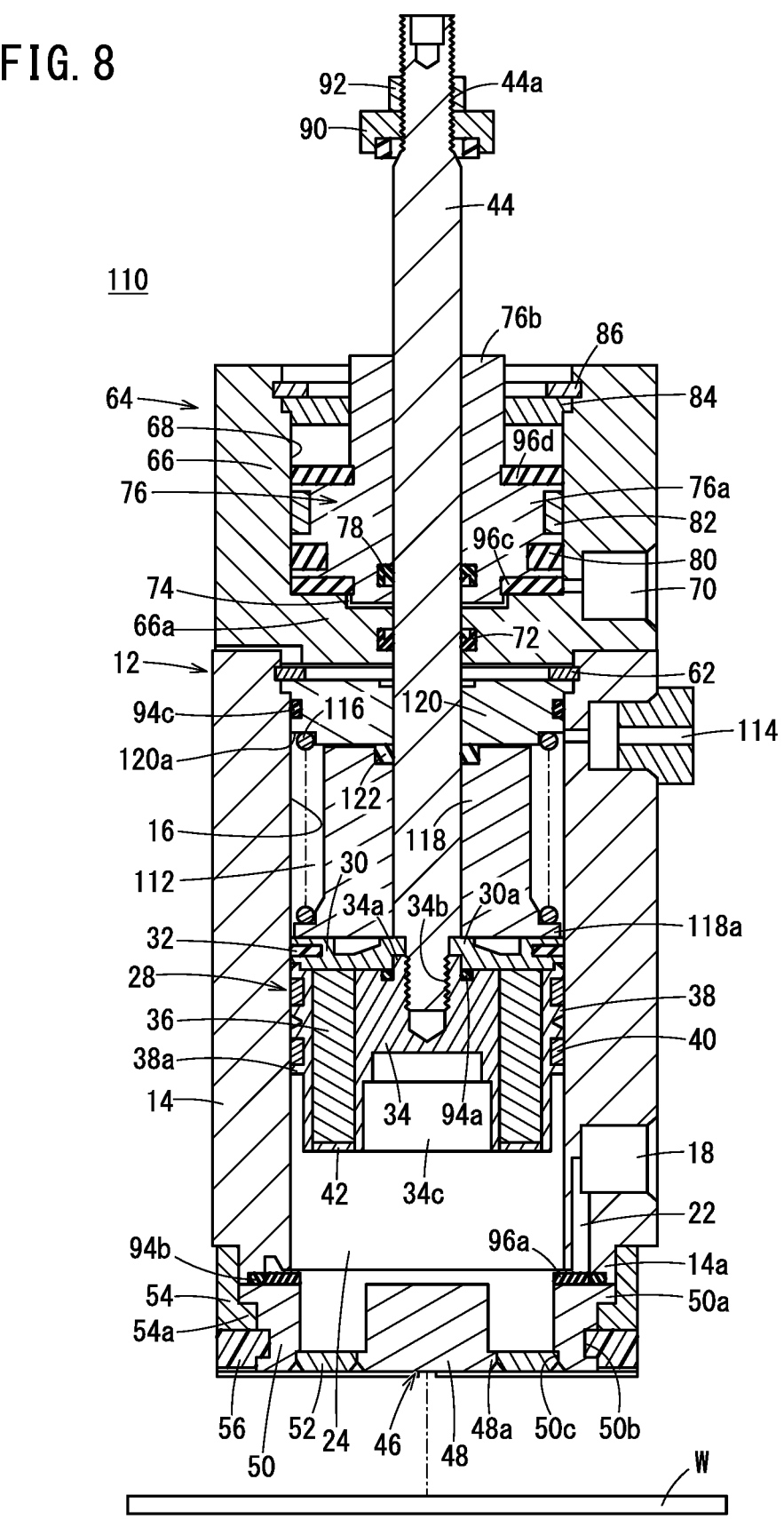
FIG. 8 is a cross-sectional view of the magnetic chuck of FIG. 6 when releasing the workpiece.

Next, a magnetic chuck 110 according to a third embodiment of the present invention will be described with reference to FIGS. 6 to 8. In the magnetic chuck 110 according to the third embodiment, constituent elements that are the same as or equivalent to those of the above-described magnetic chuck 10 are denoted by the same reference numerals, and detailed description thereof is omitted.

Figure 6:
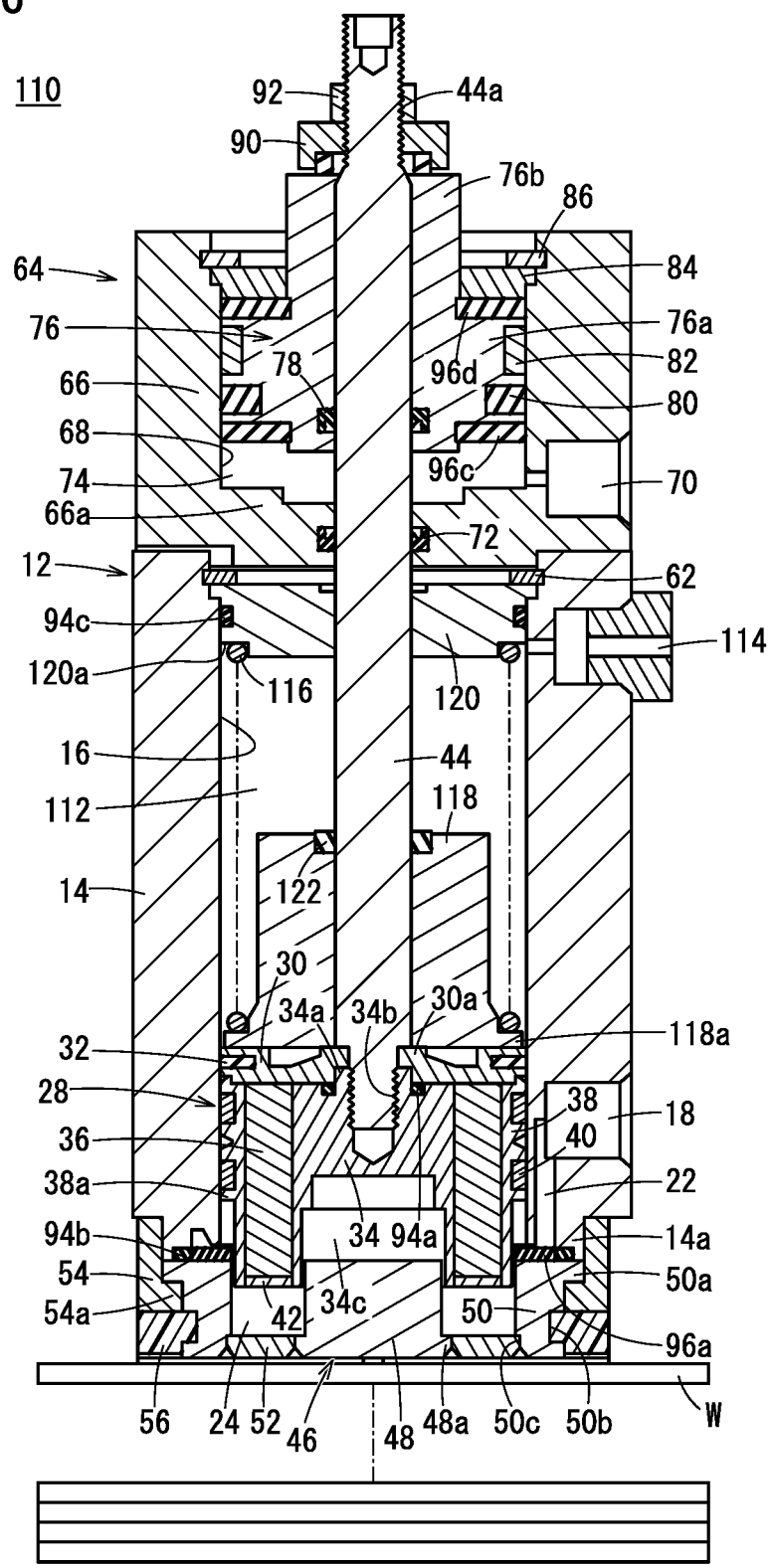
FIG. 6 is a cross-sectional view of a magnetic chuck according to a third embodiment of the present invention (a cross-sectional view when attracting a workpiece)

As shown in FIG. 6, a coil spring 116 that biases the first piston 28 downward is disposed in a second air chamber 112. A cylindrical spring guide 118 is disposed inside the coil spring 116. A lower surface of the spring guide 118 abuts against the upper surface of the seal holder 30 of the first piston 28. The spring guide 118 is made of a paramagnetic material such as an aluminum alloy.

A lower end of the spring guide 118 includes a spring receiving portion 118a that protrudes radially outward. A lower end of an intermediate cover 120 includes a spring receiving portion 120a formed of a stepped portion. An upper end of the coil spring 116 is supported by the spring receiving portion 120a of the intermediate cover 120, and the lower end of the coil spring 116 is supported by the spring receiving portion 118a of the spring guide 118.

The piston rod 44 extends upward from the intermediate cover 120 through the center of the spring guide 118 and the center of the intermediate cover 120. A damper 122 is attached to an upper surface of the spring guide 118. When the first piston 28 ascends, the damper 122 comes into contact with the intermediate cover 120 to alleviate shocks. The intermediate cover 120 does not include a rod packing or a damper.

The inner diameter of the second cylinder hole 68 is the same as the inner diameter of the first cylinder hole 16. A second port 114 is configured as a port that is open to the atmosphere. That is, the second air chamber 112 is always open to the atmosphere via the second port 114. The "upper end position" is achieved by supplying air to the first air chamber 24 and exhausting air from the third air chamber 74 (see FIG. 8). The "lower end position" is achieved by exhausting air from the first air chamber 24 and the third air chamber 74 (see FIG. 7). The "adjustment position" is achieved by supplying air to the third air chamber 74 and exhausting air from the first air chamber 24 (see FIG. 6).

When the first piston 28 is controlled to be in the "adjustment position", the first piston 28 and the piston rod 44 are biased downward by the biasing force of the coil spring 116. When air is supplied to the third air chamber 74, the second piston 76 is biased upward. The stopper 90 integral with the downwardly biased piston rod 44 abuts against the upwardly biased second piston 76.

The force with which the upwardly biased second piston 76 pushes up the piston rod 44 via the stopper 90 exceeds the force with which the piston rod 44 is biased downward. Therefore, the second piston 76 is displaced to the uppermost position in the second cylinder hole 68, and is held at a position where the fourth damper 96d abuts against the top cover 84. Thereafter, when the magnetic chuck 110 approaches and comes into contact with the plurality of workpieces stacked on the floor surface, only the uppermost workpiece W is attracted.

According to the magnetic chuck 110 of the present embodiment, the first piston 28 can be controlled to be in three positions: the "upper end position" where no magnetic force acts on the workpiece W, the "lower end position" where the workpiece W is retained with the maximum magnetic force, and the "adjustment position" where the workpiece W is attracted with a predetermined magnetic force smaller than the maximum magnetic force. Therefore, only one workpiece W among the plurality of stacked workpieces can be attracted, and the workpiece W can be retained with the maximum magnetic force and can be safely transported.

Further, by changing the position of the stopper 90 relative to the piston rod 44, the magnetic force acting on the workpiece W at the "adjustment position" can be set to optimum magnitude. Further, since there is no need to supply air to the second air chamber 112, the air supply system can be further simplified.

Fourth Embodiment

Next, a magnetic chuck 130 according to a fourth embodiment of the present invention will be described with reference to FIGS. 9 to 12. In the magnetic chuck 130 according to the fourth embodiment, constituent elements that are the same as or equivalent to those of the above-described magnetic chuck 10 are denoted by the same reference numerals, and detailed description thereof is omitted.

Figure 9:
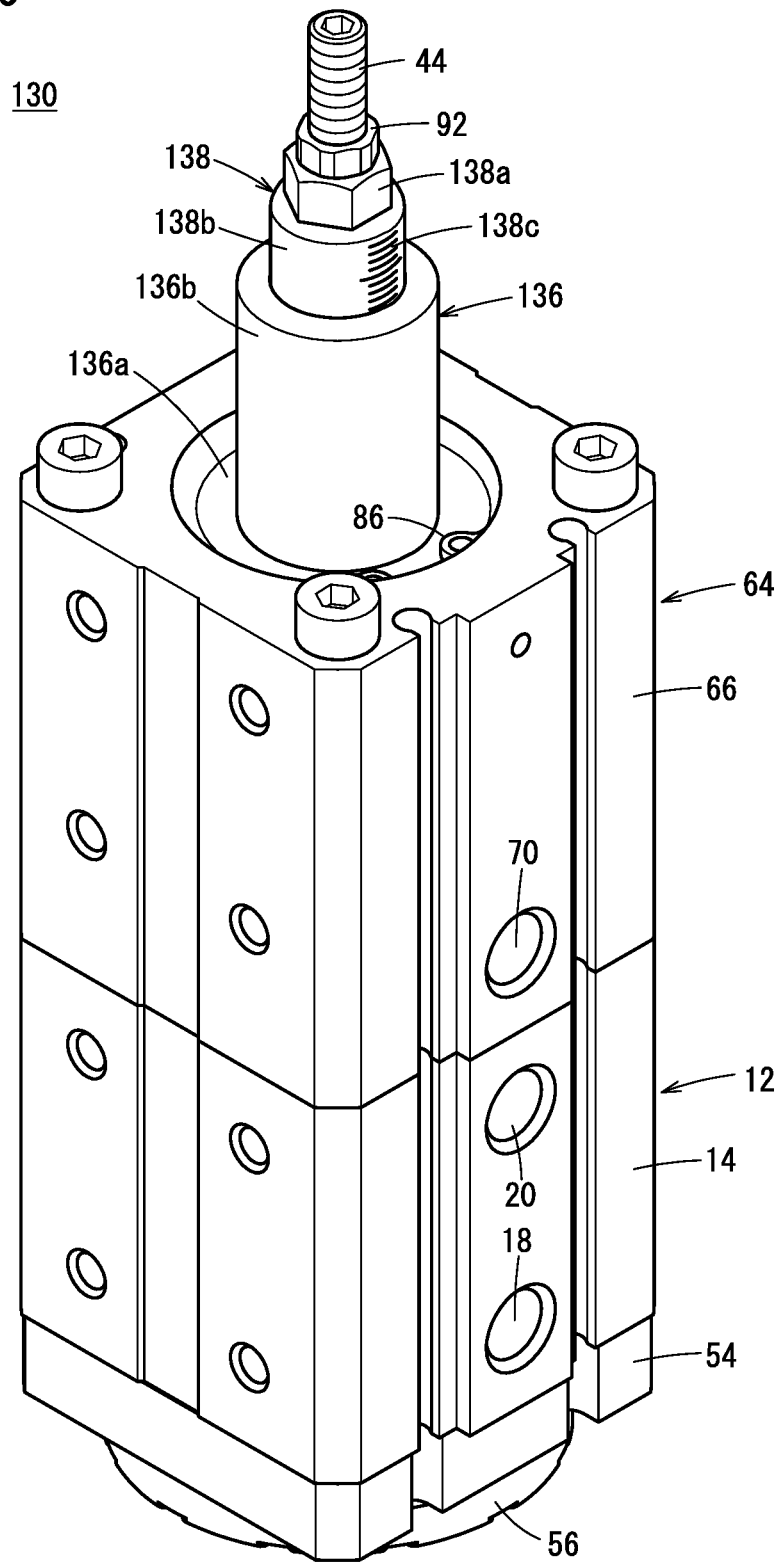
FIG. 9 is an external view of a magnetic chuck according to a fourth embodiment of the present invention.
Figure 10:
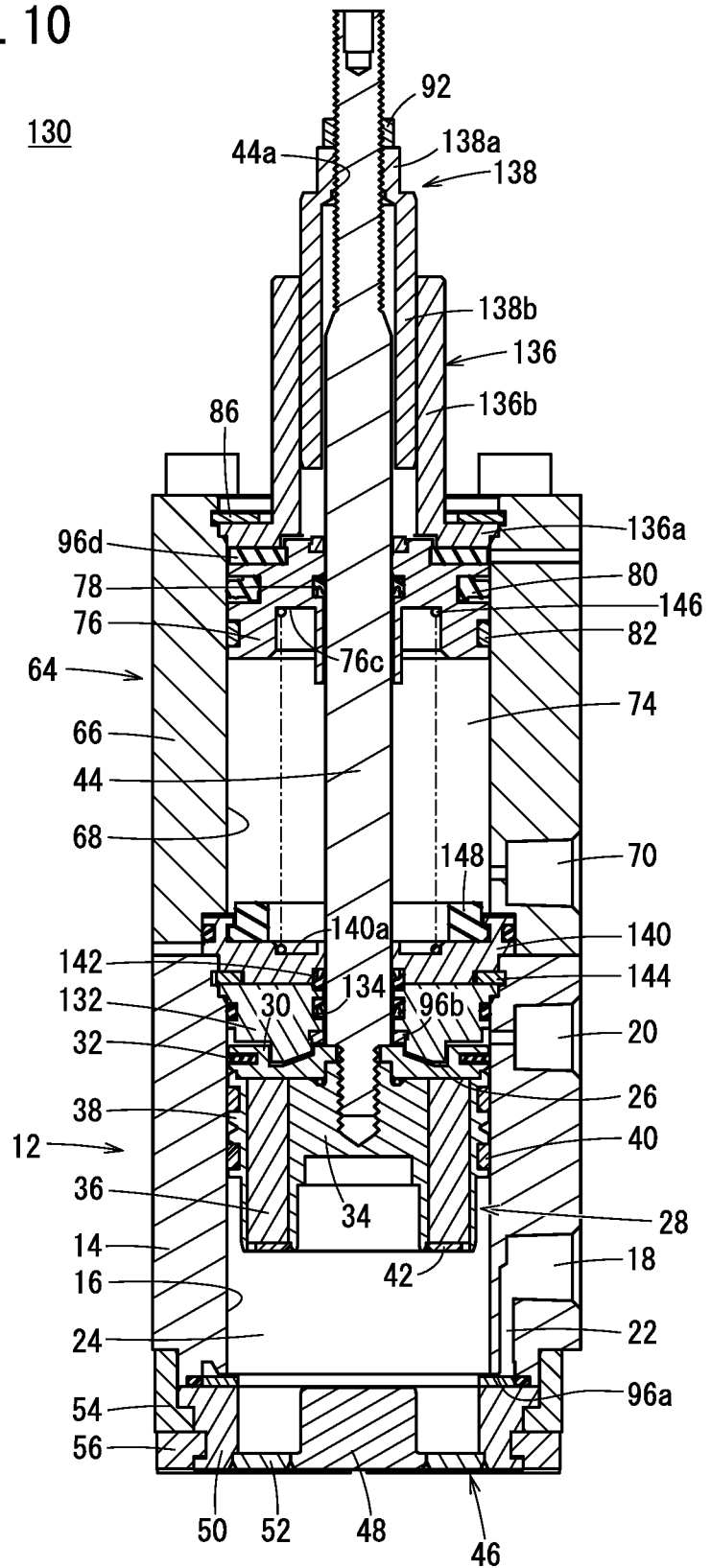
FIG. 10 is a cross-sectional view of the magnetic chuck of FIG. 9.
Figure 11:
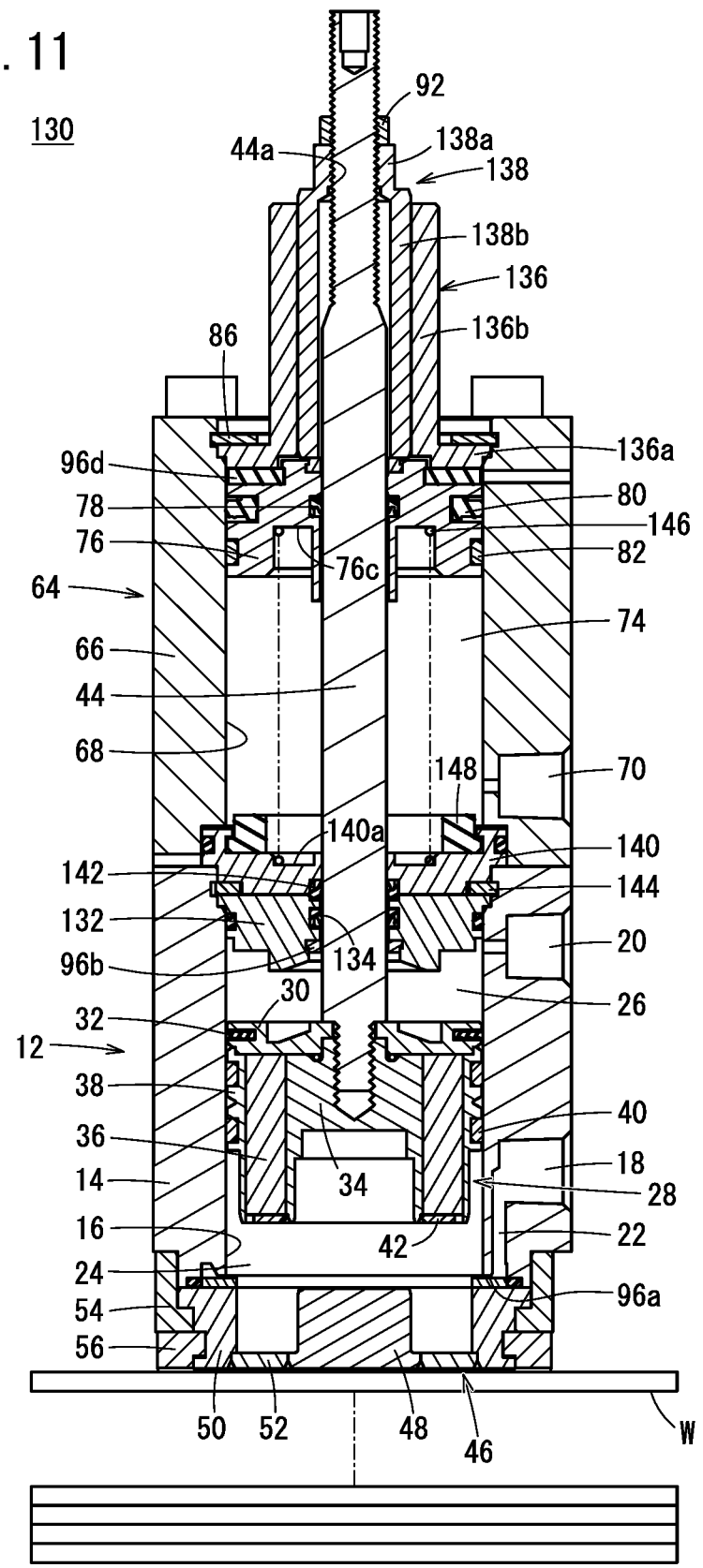
FIG. 11 is a cross-sectional view of the magnetic chuck of FIG. 9 when attracting a workpiece.
Figure 12:
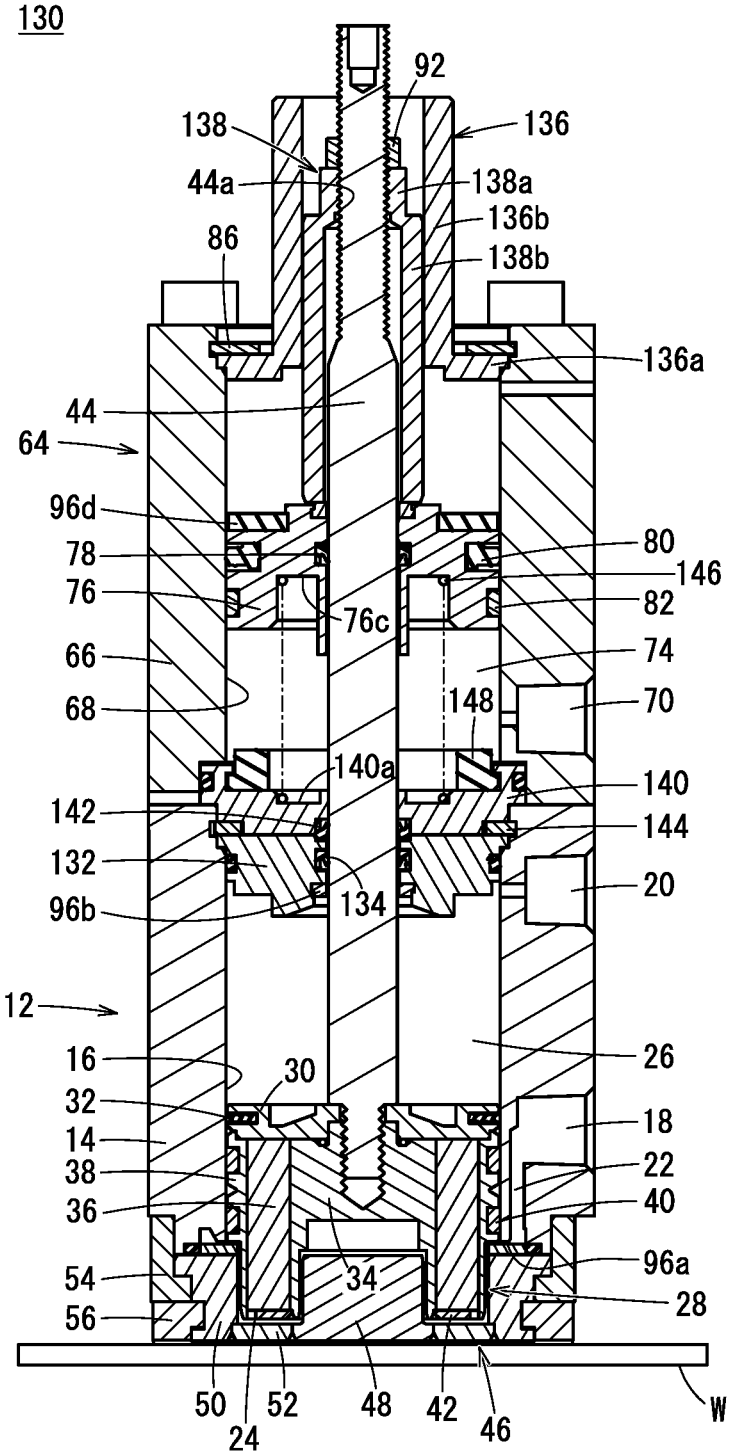
FIG. 12 is a cross-sectional view of the magnetic chuck of FIG. 9 when transporting the workpiece.

As shown in FIGS. 9 and 10, a first cylinder 12 includes a first cylinder tube 14, a first piston 28, a bottom cover 46 and a first intermediate cover 132. A second cylinder 64 includes a second cylinder tube 66, a second piston 76, a top cover 136 and a second intermediate cover 140. The first intermediate cover 132 is fixed to an upper portion of the first cylinder tube 14 via a latching ring 144. The second intermediate cover 140 is fixed to a lower portion of the second cylinder tube 66, and is in contact with the first intermediate cover 132.

A tubular second cylinder tube 66 has a circular second cylinder hole 68. An inner diameter of the second cylinder hole 68 is the same as an inner diameter of a first cylinder hole 16. A second air chamber 26 is a space surrounded by the first piston 28, the first cylinder tube 14, and the first intermediate cover 132. A third air chamber 74 is a space surrounded by the second piston 76, the second cylinder tube 66, and the second intermediate cover 140. The pressure of the air supplied to the third port 70 is the same as the pressure of the air supplied to the second port 20.

The top cover 136 includes an annular plate portion 136a and a cylindrical main body portion 136b that extends upward from an inner periphery of the plate portion 136a. The top cover 136 is fixed to an upper portion of the second cylinder tube 66 on an outer periphery of the plate portion 136a. The main body portion 136b of the top cover 136 protrudes upward from the second cylinder tube 66.

A stopper 138 includes a cylindrical threaded portion 138a with an internal thread and a cylindrical main body portion 138b that expands in diameter from the threaded portion 138a and extends downward. The stopper 138 is inserted inside the main body portion 136b of the top cover 136 and is movable up and down relative to the top cover 136. The stopper 138 is capable of abutting against the second piston 76 at a lower end of the main body portion 138b. At least a part of the main body portion 138b of the stopper 138 is covered by the main body portion 136b of the top cover 136. A lower end of the main body portion 138b of the stopper 138 is not exposed outside.

The piston rod 44 is inserted through the first intermediate cover 132, the second intermediate cover 140, and the second piston 76, and extends upward from the second piston 76. The piston rod 44 is in sliding contact with a rod packing 134 mounted on the first intermediate cover 132 and a rod packing 142 mounted on the second intermediate cover 140. The second piston 76 is movable up and down relative to the piston rod 44. A fourth damper 96d is attached to an upper part of the second piston 76. When the second piston 76 ascends, the fourth damper 96d comes into contact with the plate portion 136a of the top cover 136 to alleviate shocks.

The threaded portion 138a of the stopper 138 and a lock nut 92 are screw-engaged with the externally threaded portion 44a of the piston rod 44. After the position of the stopper 138 is adjusted to a predetermined position relative to the piston rod 44, the stopper 138 is fixed to the piston rod 44. A scale 138c is indicated on a top outer surface of the main body portion 138b of the stopper 138. In a state that the first piston 28 and the piston rod 44 are each displaced to an uppermost portion, the position of the stopper 138 can be realized by reading the scale 138c that is pointed to by the upper end of the top cover 136.

A coil spring 146 biasing the second piston 76 upward is disposed in the third air chamber 74. An upper end of the coil spring 146 is supported by a spring receiving portion 76c of the second piston 76, and a lower end of the coil spring 146 is supported by a spring receiving portion 140a of the second intermediate cover 140. A third damper 148 is attached to an upper surface of the second intermediate cover 140. When the second piston 76 descends, the third damper 148 comes into contact with the second piston 76 to alleviate shocks.

The "upper end position" is achieved by supplying air to the first air chamber 24 and exhausting air from the second air chamber 26 and the third air chamber 74 (see FIG. 10). The "lower end position" is achieved by supplying air to the second air chamber 26 and exhausting air from the first air chamber 24 and the third air chamber 74 (see FIG. 12). The "adjustment position" is achieved by supplying air to the second air chamber 26 and the third air chamber 74 and exhausting air from the first air chamber 24 (see FIG. 11).

When the first piston 28 is controlled to be in the "adjustment position", air is supplied to the second air chamber 26, whereby the first piston 28 and the piston rod 44 are biased downward. When the first piston 28 is controlled to be in the "adjustment position", air is supplied to the third air chamber 74, and the second piston 76 receives the biasing force of the coil spring 146, whereby the second piston 76 is biased upward. The stopper 138 that is integral with the piston rod 44 biased downward abuts against the second piston 76 biased upward.

The piston area of the second piston 76 receiving the pressure by the air in the third air chamber 74 is equal to the piston area of the first piston 28 receiving the pressure by the air in the second air chamber 26. Further, the air pressure in the third air chamber 74 is the same as the air pressure in the second air chamber 26. That is, the force with which the second piston 76 is biased upward by the air in the third air chamber 74 is the same as the power with which the piston rod 44 is biased downward by the air in the second air chamber 26. The force of the second piston 76 biased upward that pushes up the piston rod 44 via the stopper 138 exceeds the force that biases the piston rod 44 downward, by an amount of the biasing force of the coil spring 146. Therefore, the second piston 76 is held at a position where the second piston 76 is displaced to the uppermost position in the second cylinder hole 68.

In this case, the force with which the first piston 28 and the piston rod 44 are biased downward by the air in the second air chamber 26 is set such that the force exceeds the biasing force of the coil spring 146 received by the second piston 76 when the first piston 28 is controlled to be in the "lower end position". The air pressure supplied to the second air chamber 26 is set such that the "lower end position" is realized.

According to the magnetic chuck 130 of the present embodiment, the first piston 28 can be controlled to be in the three positions: the "upper end position" where no magnetic force acts on the workpiece W, the "lower end position" where the workpiece W is retained with the maximum magnetic force, and the "adjustment position" where the workpiece W is attracted with a predetermined magnetic force that is smaller than the maximum magnetic force. Therefore, only one workpiece W among the plurality of stacked workpieces can be attracted, and the workpiece W can be retained with the maximum magnetic force and can be safely transported.

Further, by changing the position of the stopper 138 relative to the piston rod 44, the magnetic force acting on the workpiece W at the "adjustment position" can be set to optimum magnitude. In this case, since the main body portion 138b of the stopper 138 is covered by the main body portion 136b of the top cover 136, there is no concern that an operator's finger is caught between the lower end of the stopper 138 and the second piston 76. Since the scale 138c is indicated on the outer surface of the upper portion of the stopper 138, the operator can easily adjust the position of the stopper 138 relative to the piston rod 44.

The magnetic chuck according to the present invention is not limited to the embodiments described above, but various configurations can be adopted therein without deviating from the essence and gist of the present invention.

The invention claimed is:

1. A magnetic chuck that attracts and retains a workpiece by a magnetic force of a permanent magnet, the magnetic chuck comprising:
a first cylinder and a second cylinder that are arranged in series with each other, wherein a first piston of the first cylinder includes the permanent magnet, a piston rod connected to the first piston is inserted into a second piston of the second cylinder, a stopper configured to abut against the second piston is fixed to the piston rod, and a position of the stopper relative to the piston rod is configured to be changed.

2. The magnetic chuck according to claim 1, wherein the first cylinder includes a first air chamber disposed on one side of the first piston, a second air chamber disposed on another side of the first piston, a first port through which air is supplied to and exhausted from the first air chamber, and a second port through which air is supplied to and exhausted from the second air chamber, and the second cylinder includes a third air chamber disposed on one side of the second piston, and a third port through which air is supplied to and exhausted from the third air chamber, and when air is supplied to the second air chamber and the third air chamber, the stopper abuts against the second piston and the first piston is controlled to be in a position separated from a stroke end by a predetermined distance, whereby a workpiece is allowed to be attracted with a predetermined magnetic force that is smaller than a maximum magnetic force.

3. The magnetic chuck according to claim 2, wherein a pressure of the air supplied to the third air chamber is same as a pressure of the air supplied to the second air chamber, and a piston area of the second piston that receives the pressure of the air supplied to the third air chamber is larger than a piston area of the first piston that receives the pressure of the air supplied to the second air chamber.

4. The magnetic chuck according to claim 2, wherein a pressure of the air supplied to the third air chamber is higher than a pressure of the air supplied to the second air chamber, and a piston area of the second piston that receives the pressure of the air supplied to the third air chamber is same as a piston area of the first piston that receives the pressure of the air supplied to the second air chamber.

5. The magnetic chuck according to claim 1, wherein the first cylinder includes a first air chamber disposed on one side of the first piston, a second air chamber disposed on another side of the first piston, a first port through which air is supplied to the first air chamber, and a second port through which the second air chamber is constantly open to atmosphere, and the second cylinder includes a third air chamber disposed on one side of the second piston, and a third port through which air is supplied to and exhausted from the third air chamber, and a spring is disposed in the second air chamber and configured to bias the first piston, and when air is supplied to the third air chamber, the stopper abuts against the second piston and the first piston is controlled to be in a position separated from a stroke end by a predetermined distance, whereby a workpiece is allowed to be attracted with a predetermined magnetic force that is smaller than a maximum magnetic force.

6. The magnetic chuck according to claim 1, wherein the first cylinder includes a first air chamber disposed on one side of the first piston, a second air chamber disposed on another side of the first piston, a first port through which air is supplied to and exhausted from the first air chamber, and a second port through which air is supplied to and exhausted from the second air chamber, and the second cylinder includes a third air chamber disposed on one side of the second piston, and a third port through which air is supplied to and exhausted from the third air chamber, and a spring is disposed in the third air chamber and configured to bias the second piston, and when air is supplied to the second air chamber and the third air chamber, the stopper abuts against the second piston and the first piston is controlled to be in a position separated from a stroke end by a predetermined distance, whereby a workpiece is allowed to be attracted with a predetermined magnetic force that is smaller than a maximum magnetic force.

7. The magnetic chuck according to claim 1, wherein the second cylinder comprises a top cover and at least a part of the stopper is covered by the top cover.

8. The magnetic chuck according to claim 1, wherein a scale is indicated on an outer surface of the stopper.

* * * * *